1,909,208

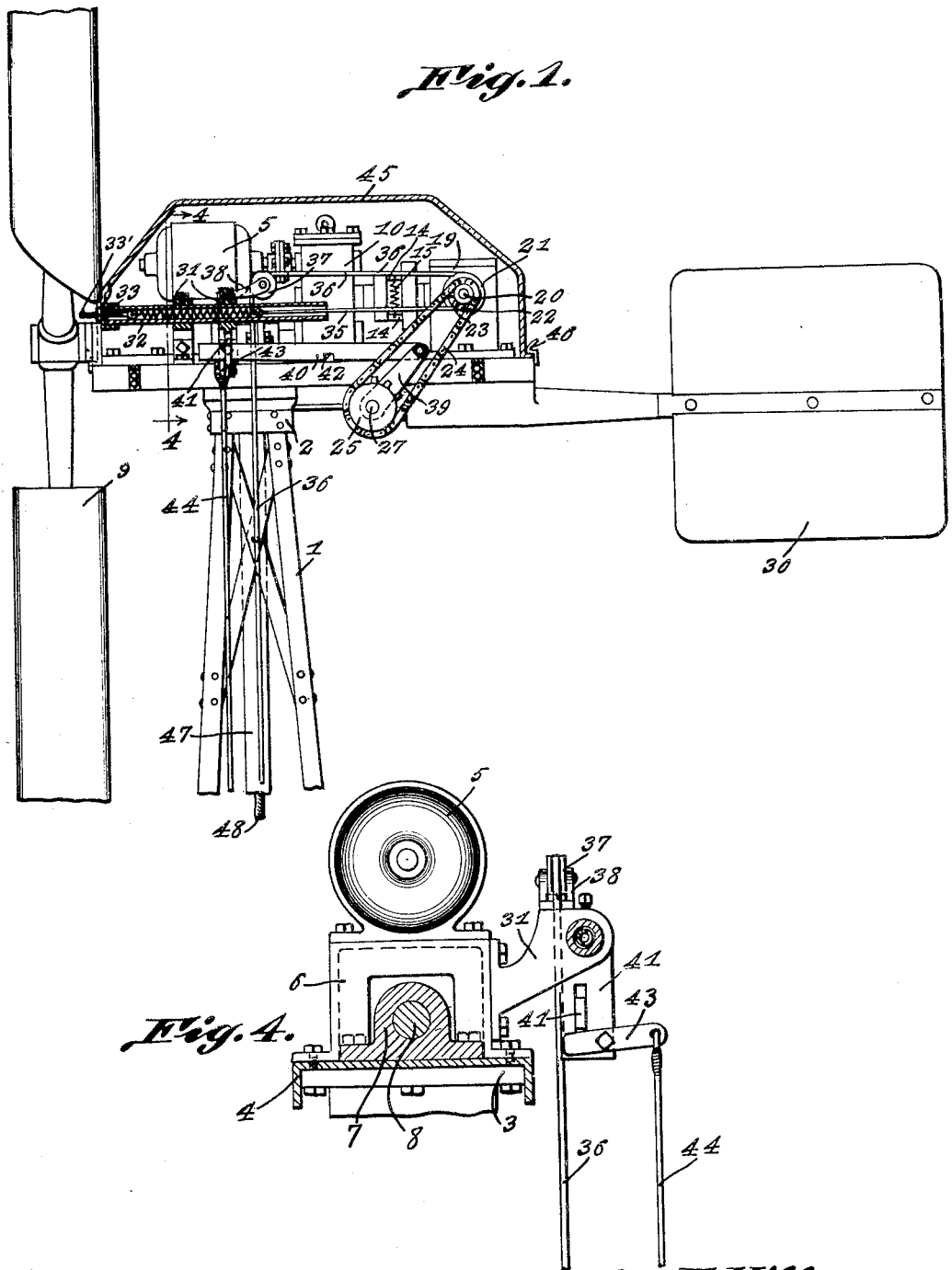
May 16, 1933.     C. E. MILLER     1,909,208
WIND MOTOR
Filed June 29, 1932     2 Sheets-Sheet 1
Charles E. Miller, INVENTOR
BY Victor J. Evans & Co.
ATTORNEY May 16, 1933.  C. E. MILLER  1,909,208
WIND MOTOR
Filed June 29, 1932  2 Sheets-Sheet 2
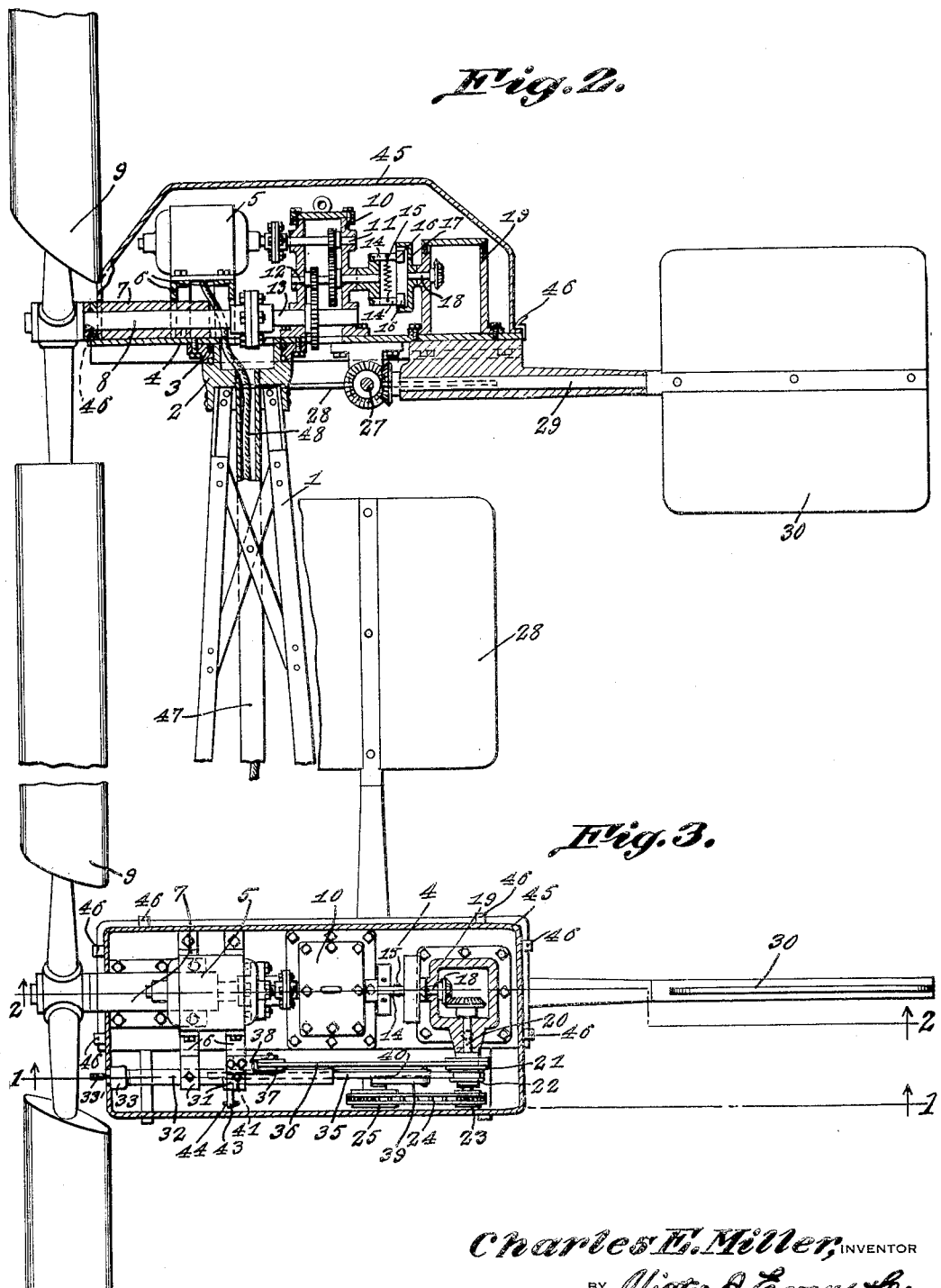
Charles E. Miller, INVENTOR
BY Victor J. Evans & Co.
ATTORNEY Patented May 16, 1933

UNITED STATES PATENT OFFICE

CHARLES E. MILLER, OF ANDERSON, INDIANA

WIND MOTOR

Application filed June 29, 1932. Serial No. 620,003.

This invention relates to wind motors and its general object is to provide a wind actuated motor which includes speed controlling means that is automatically actuated in accordance with the velocity of the wind so as to maintain a uniform, safe maximum speed for the motor or to completely stop the wind wheel in a gale, therefore the parts cannot become damaged or broken due to speed, as the result of severe wind, and the speed controlling means can also be manually actuated and is likewise provided with manually actuated releasing means.

Another object of the invention is to provide a wind motor of the character set forth, that is simple in construction, inexpensive to manufacture and extremely efficient in operation and service.

This invention also consists in certain other features of construction and in the combination and arrangement of the several parts, to be hereinafter full described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a sectional view taken approximately on line 1—1 of Figure 3, looking in the direction of the arrows.

Figure 2 is a sectional view taken approximately on line 2—2 of Figure 3, looking in the direction of the arrows.

Figure 3 is a horizontal sectional view taken through the housing.

Figure 4 is a sectional view taken approximately on line 4—4 of Figure 1, looking in the direction of the arrows.

Referring to the drawings in detail, the reference numeral 1 indicates a derrick which may be of any well known construction and has secured to its upper end a cap member 2 this is provided with an annular shoulder for the purpose of rotatably receiving a ring member 3 that is secured to the underside of the base 4 of my wind motor. Arranged between the cap member 2 and the ring member 3 are suitable anti-friction means, and this means is in the form of balls in the present case.

While my wind motor may be used for many purposes, I have disclosed the same as being used for driving a generator 5 that is mounted upon a platform 6 which is suitably fixed to the base 4 as best shown in Figure 3.

Secured to the base is a bearing sleeve 7 that has mounted for rotation therein a shaft 8 that extends beyond the forward end of the base and has secured thereto a wind wheel which in the form as shown includes three propeller blades 9. However, any number of blades may be employed without departing from the spirit of the invention and of course the blades may be of any well known type.

Mounted on the base is a gear box 10 that has arranged in bearings in the walls thereof a stub shaft 11 which is connected to the shaft of the generator as shown, and the stub shaft 11 has secured thereto a relatively small gear which meshes with a relatively large gear that is fixed to a stub shaft 12, the latter having likewise fixed thereto a relatively small gear that also meshes with a relatively large gear that is secured to a shaft 13. The shaft 13 is journaled in the walls of the gear box and extends through one wall thereof for connection with the shaft 8 of the wind wheel, and by this construction, it will be apparent that the shaft 13 is rotated by the shaft 8, for actuating the generator through the instrumentality of the gears and shafts disposed in the gear box.

The stub shaft 12 extends through the gear box and has secured thereto a part of a clutch means which is in the form of a governor and the clutch means includes pivotally mounted arms 14 which are urged toward each other through the instrumentality of a coil spring 15 that has its ends fixed to the arms as clearly shown in Figure 2. Secured to the outer free ends of the arms 14 are shoes 16 arranged to engage the inner face of a clutch collar 17 that is secured to a stub shaft 18 which extends into a gear box 19 the latter being secured to and rising from the base as shown in Figures 2 and 3. The inner end of the stub shaft 18 has secured thereto a pinion which meshes with a bevel gear and the bevel gear is secured to a stub shaft 20 which extends through the gear box 19 and arranged at right angles with respect to the stub shaft 18.

The outer end of the stub shaft 20 has keyed thereto a pair of pulley wheels 21 and 22, as well as a sprocket gear 23 which has trained thereabout a sprocket chain 24 that is likewise trained about a sprocket gear 25 which is fixed to a shaft 27 that is mounted in a bearing secured to and depending from the base 4. The shaft 27 has secured thereto a wind vane 28 which may be termed a side vane and is geared to a shaft 29 of a wind vane 30, which is the rear vane, in a manner whereby the shafts 27 and 29 are disposed at right angles with respect to each other so that the wind vanes will be arranged accordingly as clearly shown in Figure 3. The shaft 29 is likewise journaled in a bearing secured to and depending from the base 4.

Secured to and extending laterally from the generator platform are brackets 31 arranged in parallelism with respect to each other and extending through the brackets and supported thereby is a tube 32 that is provided with a screw cap 33 secured to one end thereof and extending through the screw cap is an eye bolt 33' which has threaded thereon a nut. The eye bolt and its nut acts in the capacity as an adjusting means for a coil spring 34 which has one of its ends secured to the eye bolt and its opposite end has secured thereto one end of a cable belt 35 which has its opposite end trained about and secured to the pulley wheel 22.

The pulley wheel 21 has trained thereabout and fixed thereto one end of a cable 36 that is likewise trained about a pulley 37 which is journaled in an eared bracket 38 that is fixed to one of the brackets 31 as best shown in Figure 4, and the cable 36 is of a length to extend to the ground or in convenient reach to be pulled by the operator for a purpose which will be later described. The shaft 27 has fixed thereto a link 39 that has pivotally secured to its outer end a lever 40 that forms part of a latching means and which extends through a slot arranged in a guide member or keeper 41. The lever 40 is mounted for slidable movement in the keeper 41 and is provided with a notch 42 to be received by the keeper, and in order to release the lever 40 from the keeper 41 I provide the latch arm 43 which is pivotally secured to the keeper as best shown in Figure 4 and has connected with its outer end a cable 44 that is of a length to extend in convenient reach of the operator so that the lever 40 can be released from the ground.

I provide a housing for my wind motor and it will be noted that the housing which is indicated by the reference numeral 45 is detachably associated with the base through the instrumentality of spring catch means 46 whereby the housing can be removed with very little effort as will be apparent.

Depending from the cap member 2 is a tubular member 47 through which passes the conductors 48 from the generator 5.

From the above description and disclosure of the drawings, it will be obvious that I have provided a wind motor that includes a speed controlling means which is automatically actuated in accordance with the velocity of the wind, and in the event the wind wheel is operated at an excessive rate of speed, the pivoted arms 14 of the clutch means or governor are caused to swing outwardly against their spring 15, through the instrumentality of centrifugal force and this action will result in the shoes 16 engaging the inner surface of the clutch collar 17 and thereby rotate the stub shaft 20 through the medium of its gear and the pinion of the stub shaft 18. The rotating of the stub shaft 20 will rotate the shaft 27 due to the connection of the sprockets and sprocket chain as shown in Figures 1 and 3, with the result the vane 28 will be moved from its normal horizontal position to an operative vertical position, and the wind vane 30 will be moved from its operative vertical position to a horizontal position with the result the wind which was acting upon the vane 30 to hold the wind wheel in the wind, will act upon the vane 28 and cause the motor together with its wind wheel to shift or rotate on its bearings to dispose the wind wheel out of the wind, therefore the speed of the wind wheel will be materially retarded or completely stopped it depending of course upon whether or not the vanes are given a complete quarter turn or a partial turn as will be apparent. If the vanes are given a complete quarter turn, the lever 40 is moved to an extent whereby the notch 42 thereof is received by the guide member or keeper 41, and in that event the motor is retained in its turned or inoperative position until released by the operator who will pull upon a cable 44 which causes the inner end of the latch arm 43 to lift the lever 40 which will be drawn back to its normal position by the coil spring 34 that is connected to the cable belt 35 which in turn is secured to the pulley wheel 22. This spring actuated feature not only returns the motor to its operative position, but of course has a tendency to urge the same thereto, with the result the wind wheel is disposed in various positions in accordance with the direction of the wind, during normal operation so as to insure ample wind to drive the motor which in turn drives the generator in the present instance, and due to the speed controlling means which of course includes the gears in the gear box 10, the generator is driven at a uniform and safe maximum speed.

In order to manually operate the wind vanes, the cable 36 is pulled which will result in the movement of the pulley wheel 21 that in turn moves the shaft 27 through the instrumentality of the sprockets and chain.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In a wind motor, a base for said motor, means for rotatably receiving the base for mounting the motor accordingly, a housing for said motor and being detachably secured to said base, a shaft journaled in said housing, a wind wheel secured to said shaft, speed increasing means having connection with said shaft, means for controlling the speed and including cooperating wind vanes normally arranged at right angles with respect to each other, means for connecting the wind vanes to simultaneously move the same and including a shaft, centrifugal means having connection with the speed increasing means and the second shaft respectively, spring means cooperating with the centrifugal means for changing the angle of said vanes in accordance with the speed of the wind wheel for moving the latter into and out of the path of the wind, latching means for the vanes to hold the wind wheel out of the path of the wind, and including a link secured to said second shaft, a lever pivotally secured to said link and being provided with a notch, a keeper having a slot for the passage of said lever therethrough and being adapted to receive the notch, a latch arm engageable with the lever to release the latter from the keeper and a cable secured to the latch arm.

2. In a wind motor, a base for said motor, means rotatably receiving said base for mounting the motor accordingly, a wind wheel, speed increasing means connected with said wind wheel, centrifugally operated clutch means connected with the speed increasing means, cooperating wind vanes normally arranged at right angles with respect to each other and including shafts geared together for operating the vanes simultaneously, means connecting the centrifugally operated clutch means with one of said shafts, a sprocket chain included in the connecting means, sprocket wheels for said chain, one of said sprocket wheels being secured to the last mentioned shaft, a shaft for the other sprocket wheel, pulley wheels secured to the last mentioned shaft, a cable belt secured to one pulley wheel, adjustable spring means secured to a cable belt and cooperating with the centrifugally operated clutch means for changing the angle of said vanes in accordance with the speed of the wind wheel for moving the wind wheel into and out of the path of the wind, a cable secured to the other pulley for manually changing the angle of the wind vanes, means for latching the wind wheel out of the path of the wind and having connection with the first mentioned shaft, and means for releasing the latching means.

3. In a wind motor, a wind wheel, speed controlling means for the wind wheel and including the wind responsive means, centrifugal means included in the speed controlling means, and having conection with the wind wheel, spring means cooperating with the centrifugal means for moving the wind responsive means into and out of the path of the wind, latching means for the wind responsive means to hold the wind wheel out of the path of the wind and including a link directly connected to the wind responsive means, a lever pivotally secured to said link and being provided with a notch, a keeper having a slot for the passage of said lever therethrough and being adapted to receive the notch, a latch arm engageable with the lever to release the latter from the keeper, and means secured to the latch arm for actuating the later.

4. In a wind motor, a wind wheel, centrifugally operated clutch means connected with the wind wheel, wind responsive means including a shaft, means connecting the centrifugally operated means with the wind responsive means, a sprocket chain included in the connecting means, sprocket wheels for said chain, one of said sprocket wheels being secured to said shaft, a shaft for the other sprocket wheel, pulley wheels secured to the last mentioned shaft, a cable belt secured to one pulley wheel, adjustable spring means secured to the cable belt and cooperating with the centrifugally operated clutch means for automatically changing the position of the wind responsive means in accordance with the speed of the wind wheel for moving the latter into and out of the path of the wind, a cable secured to the other pulley for manually changing the position of the wind responsive means, means for latching the wind wheel out of the path of the wind and having connection with the first mentioned shaft and means for releasing the latching means.

In testimony whereof I affix my signature.

CHARLES E. MILLER.